(12) United States Patent
Urbanski

(10) Patent No.: US 8,452,659 B2
(45) Date of Patent: May 28, 2013

(54) METHOD AND APPARATUS FOR CONNECTING CONSUMERS WITH ONE OR MORE PRODUCT OR SERVICE PROVIDERS

(75) Inventor: Michael William Urbanski, Annapolis, MD (US)

(73) Assignee: Heavy Hammer, Inc., Annapolis, MD (US)

( * ) Notice: Subject to any disclaimer, the term of this patent is extended or adjusted under 35 U.S.C. 154(b) by 0 days.

(21) Appl. No.: 13/542,597

(22) Filed: Jul. 5, 2012

(65) Prior Publication Data

US 2012/0271687 A1 Oct. 25, 2012

Related U.S. Application Data

(63) Continuation of application No. 13/053,869, filed on Mar. 22, 2011.

(60) Provisional application No. 61/381,235, filed on Sep. 9, 2010, provisional application No. 61/316,695, filed on Mar. 23, 2010.

(51) Int. Cl.
*G06Q 33/00* (2012.01)

(52) U.S. Cl.
USPC ............ 705/14.66; 705/26.2; 705/26.43

(58) Field of Classification Search
USPC ................. 705/14.66, 26.1, 26.2, 26.43
See application file for complete search history.

(56) References Cited

U.S. PATENT DOCUMENTS

| 6,594,633 | B1 * | 7/2003 | Broerman ............... 705/313 |
| 6,973,436 | B1 * | 12/2005 | Shkedi ............... 705/14.44 |
| 2006/0080229 | A1 * | 4/2006 | Masella et al. ............ 705/38 |
| 2012/0059731 | A1 * | 3/2012 | Silver ................. 705/26.2 |

\* cited by examiner

*Primary Examiner* — Donald L. Champagne
(74) *Attorney, Agent, or Firm* — Ronald E. Prass, Jr.; Prass LLP

(57) ABSTRACT

A method and apparatus that for matching consumers with product or service providers is disclosed. The method may include establishing one or more profiles from one or more product or service providers, establishing one or more profiles from one or more consumers, receiving a consumer's subject matter request, matching the consumer with one or more products or service providers based on at least one of the consumer's profile and subject matter request, and providing the consumer's contact information to the matched one or more products or service providers.

17 Claims, 5 Drawing Sheets

LiveBuyers.com                                                home | welcome.user-Logout      400
count: 14

Real Estate customer located in PRINCE GEORGE'S (UPPER MARLBORO)
Need to finance a loan between $200,000-$300,000 have approx. less than $5,000 cash on hand
for a down payment. Credit history is Poor income Level is $75k-$100k
Claim Details 10 minutes ago maxshares: 4 | numsold 1  | You own 1 slice(s) of this already Real Estate customer located in BALTIMORE (CITY EAST)
Need to finance aloan between Less than $75,000 Have approx. 40 cash on hand for a down
payment. Credit history is fair income Level is Below $25k
Claim Details 12 minutes ago maxshares: 4 | numsold 3  | You own 1 slice(s) of this already Real Estate customer located in TALBOT
Need to finance a loan between less than $75,000 Have approx. $40,000 cash on hand for a down
payment. Credit history is good income level is $25k-$50k
Claim Details 21 minutes ago maxshares: 4 | numsold 1  | You own 3 slice(s) of this already Real Estate customer located in TALBOT
Have approx. $20,000-$40,000 cash on hand for a down payment. Income Level is $25k-$50k
Claim Details about an hour ago maxshares: 4 | numsold 1  | You own 1 slice of this already Real Estate customer located in TALBOT
cash on hand for a down payment.
Claim Details about an hour ago maxshares: 4 | numsold 2  | You own 2 slice(s) of this already Real Estate customer located in KENT
Need to finance a loan between $150,000-$200,000 Have approx. $40,000+cash on hand for a
down payment. Credit history is Excellent income Level is $100k+
Claim Details 1. Maryland Real Estate
   Find Thousands of Maryland Homes.
   view photos, Tours & Detailed info.
   *www.cbmove.com/Maryland*

2. Foreclosures in Maryland
   Bid Online or at Live Auction
   Hudson and Marshall Home Auctions
   Maryland
   *www.hudsonandmarshall.com*

3. Maryland Real Estate
   Search for a Home to Buy in Your
   Area. Search by City, State or Zip.
   *realestate.aol.com/Maryland*

4. Real Estate Auctions
   Check Lists Of Upcoming Residential
   And Commercial Sales!
   Baltimore, MD
   *www.alexcooper.com*

5. Free Forclosure Listings
   Search Foreclosures by Zip Code.
   View Foreclosures for Sale.
   *bankforeclosureslisting.com*

6. Maryland Real Estate
   Find your next home in Maryland
   Search the MLS without Registering
   Maryland
   *www.marylandhomenow.com*

7. Maryland House for Sale
   Find house for sale here.
   We offer local search in your state.
   Maryland
   *maryland.local.com*

FIG. 4

METHOD AND APPARATUS FOR CONNECTING CONSUMERS WITH ONE OR MORE PRODUCT OR SERVICE PROVIDERS

PRIORITY INFORMATION

This application is a Continuation of U.S. patent application Ser. No. 13/053,869, filed on Mar. 22, 2011, which claims priority from U.S. Provisional Application Ser. No. 61/381,235, filed on Sep. 9, 2010, which claims priority from U.S. Provisional Application Ser. No. 61/316,695, filed on Mar. 23, 2010, the contents of which are incorporated herein in their entireties.

BACKGROUND OF THE DISCLOSED EMBODIMENTS

1. Field of the Disclosed Embodiments

The disclosed embodiments relate to generating a system and interface for connecting a product or service provider and a consumer in search of, or in need of such product or service.

2. Introduction

Coventional Information sites (e.g., websites, software applications, computing devices, etc.) exist for individuals and consumers to offer goods and services for sale at their standard or discounted price or at a price determined using an auction or variable pricing system. However, often consumers spend time seeking a service provider or entity to buy goods or obtain services by searching on-line or using a telephone directory. In this manner, consumers often have to spend considerable time and effort to contact several service providers via information sites or telephone to obtain an acceptable price and availability from the goods or service providers. They also are forced to search using Internet search engines or generic websites that offer multiple types of products with the hope that a product or service provider who carries the product they are looking for will show up in a search result, under the search terms they are looking for, and that the product or service provider presented will have the product at the price they are willing to pay, and be in a relevant geographic areas.

Additionally Service Providers and product or service providers spend time and resources in an effort to attract consumers for their products and services via advertising. Current advertising methods such as television, radio, and conventional online advertising, while effective in presenting information to large groups of potential buyers based on traditional demographic criteria, such as general geograhic location, and in the case of internet search engines, particular topics of interest indicated by the search, they still are not efficient. These methods require the buyer of a product or service provider's products to be exposed to the specific advertising for which that product or service provider has paid. In the scenario of internet advertising, a product or service provider's potential consumer perform a search for a term or group of terms that will return that product or service provider as part of a paid or unpaid search result on an internet search engine, or visit a particular website displaying advertising from that product or service provider.

In the event that a product or service provider does chose to develop an online advertising campaign, the product or service provider must now spend resources to manage that campaign, and entice viewers to visit their website through the use of limited advertising text, hyperlinks and advertising banners. If the consumer does select the product or service provider's advertisement it is then up to the product or service provider's website to convert the passive searcher into a consumer with effective online lead generation (which differs in effectiveness by industry and from product or service provider-to-product or service provider). Additionally not all current methods of online advertising account for "window shoppers," or users who click on the wrong link, both of which cost the advertiser money. As most product or service providers do not specialize in web design, the product or service provider's conversion rate becomes a secondary problem once a potential consumer has selected the product or service provider's website. A high conversion rate can reduce the cost per acquisition while a low conversion rate will increase the cost per acquisition.

Ultimately, regardless of the a product or service provider's ability to maintain or afford conventional methods of advertising for purposes of consumer acquisition, that advertising is expensive and does not allow the product or service provider to exactly target or reach their preferred clients. Moreover, these conventional methods rely on the consumer being exposed to that product or service provider and selecting to work with or purchase from that particular product or service provider which can be cost prohibitive for most small to medium product or service providers.

The less traditional or common place method of client acquisition is through purchasing of Leads. Leads are generally considered: consumer contact information and limited information about their interest or needs, which have been generated by some source (such as a survey, contact form, or an account created when purchasing some other service). This method, while allowing for direct access to consumers does not necessarily ensure that the consumer: a) is expecting to be contacted by a particular product or service provider, b) is interested in a product or service providers specific product (s) or industry, c) is a client that matches a particular product or service provider's specific criteria, or d) has not been contacted by numerous other product or service providers who acquired their contact information, thereby devaluing any contact by a particular product or service provider. Conversely, from the consumer's perspective, this method relies on all parties who have access to their contact information to 1) keep it secure, 2) ensure their privacy is maintained, 3) provide their information to only the people they desire, and 4) only share their information with persons or entities they specifically authorize. These conventional methods also require consumers, if they are interested in multiple products, to produce multiple leads thereby reducing any current practical implementation to little more than online versions of "Classified Wanted Ads". Additionally, once a consumer has submitted their information, they do not necessarily have any knowledge of by whom it is received.

SUMMARY OF THE DISCLOSED EMBODIMENTS

A method and apparatus that for matching consumers with product or service providers is disclosed. The method may include establishing one or more profiles from one or more product or service providers, establishing one or more profiles from one or more consumers, receiving a consumer's subject matter request, matching the consumer with one or more products or service providers based on at least one of the consumer's profile and subject matter request, and providing the consumer's contact information to the matched one or more products or service providers.

BRIEF DESCRIPTION OF THE DRAWINGS

In order to describe the manner in which the above-recited and other advantages and features of the disclosed embodiments can be obtained, a more particular description of the disclosed embodiments briefly described above will be rendered by reference to specific embodiments thereof which are illustrated in the appended drawings. Understanding that these drawings depict only typical disclosed embodiments and are not therefore to be considered to be limiting of its scope, the disclosed embodiments will be described and explained with additional specificity and detail through the use of the accompanying drawings in which:

FIG. 4 is a screen capture of an exemplary set of results that occur when a real estate-based system performs scoring on a number of consumer profiles in accordance with a possible embodiment of the disclosure.

DETAILED DESCRIPTION OF THE DISCLOSED EMBODIMENTS

Figure 1:
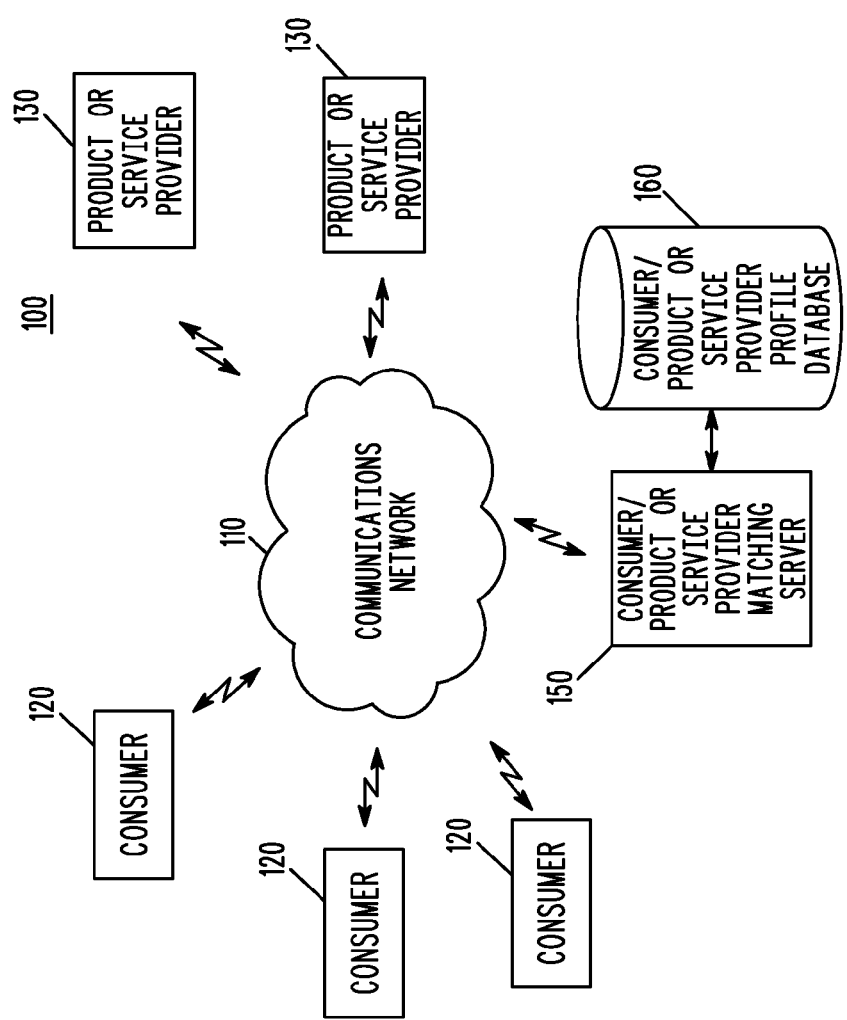
FIG. 1 illustrates an exemplary diagram of a consumer/product or service provider matching environment in accordance with a possible embodiment of the disclosure.

Additional features and advantages of the disclosed embodiments will be set forth in the description which follows, and in part will be obvious from the description, or may be learned by practice of the disclosed embodiments. The features and advantages of the disclosed embodiments may be realized and obtained by means of the instruments and combinations particularly pointed out in the appended claims. These and other features of the disclosed embodiments will become more fully apparent from the following description and appended claims, or may be learned by the practice of the disclosed embodiments as set forth herein.

Various embodiments of the disclosed embodiments are discussed in detail below. While specific implementations are discussed, it should be understood that this is done for illustration purposes only. A person skilled in the relevant art will recognize that other components and configurations may be used without parting from the spirit and scope of the disclosed embodiments.

The disclosed embodiments may comprise a variety of embodiments, such as a method and apparatus and other embodiments that relate to the basic concepts of the disclosed embodiments.

This disclosed embodiments may concern an apparatus and method for providing product or service providers with a targeted and relevant list of potential consumers, and enabling product or service providers and consumers to connect directly. More particularly, the disclosed embodiments may relate to a "Pay for Profile" method of consumer targeting and acquisition which reverses the traditional process and allows the consumer to be specific with their desired product or service criteria and therefore the product or service provider can more closely match their offers to the desires of the consumer. Product or service providers may pay for access to a consumers' profile that meets their criteria and may not pay for consumers that do not meet their criteria or that have selected the product or service provider accidently while performing a search.

"Pay-for-profile" may apply market principles to advertising on the Internet. Conventional Internet applications are passive and do not provide a platform for a product or service provider to take a proactive approach. Conventional internet applications also do not allow consumers to post profiles in order to have product or service providers offer their products or services directly to them in a controlled format. Pay-for-Profile may enable product or service providers to more accurately target internet users that meet their criteria and focus resources on their best possible consumer. Furthermore, a competitive consumer selection process may be based on a cost per acquisition, price per click, consumer price point, number of previous clicks, time posted and area of interest to helps ensure that the pricing structure reflects the market and is accessible to product or service providers regardless of their websites efficiency or the product or service provider's particular marketing budget.

Combining consumer generated profiles and lead purchasing is not commonplace. There is a need to provide a method and apparatus which can combine consumer generated profiles and lead purchasing through one's own website or third party website, combined with a method and apparatus to charge the product or service provider per access of the profile while also allowing for the possibility of consumer interaction with the profile and maintaining of consumer privacy.

The proposed disclosed system and method may also concern gathering information concerning products and/or services needed from a consumer, posting that information (which may collectively be considered a profile, lead, or contact information) using a public or member-based presentation forum (e.g., a website, application page, intranet, etc.), and then providing commercial entities (or other consumers) the ability to access all or portions of the profile: to offer their goods and/or services through the intermediary presenter (e.g. the website, application page, intranet, etc.), to review data for consumer research purposes, and to purchase contact information for the purpose of resale.

The Consumer Profiles

Consumer profiles may be created and updated automatically or by the consumer through an interaction with an application or website. Profiles may not be limited to contact information of a single individual or entity.

The profile could contain both default or automatically generated values for any particular information contained in the profile. The profile may contain multiple sub-profiles within it. Each sub-profile may contain information unique to that sub-profile or duplicate information inherited from other profiles, sub-profiles, and parent profile. A profile may contain any information relevant to a consumer or a potential product or service provider. Examples of information contained in the profile may be: contact information of the consumer; geographic information relevant to the consumer; parameters regarding product or service price features brands, color, manufacture, safety ratings, and consumer ratings; the general description of a desired product; how many times a profile may be accesses, and particular product or service providers or distributors that may or may not be authorized to contact this consumer. Profiles may also contain the source of the profile, system information about the consumer, such as the consumer's operating system (OS) or internet protocol (IP) address, history of websites visited, and any other information that maybe collected automatically during creation of the profile.

Profiles may also be associated with particular channels which could include industries, particular categories of products, or manufactures.

Consumer Participation in the System:

Consumer may update all or part of the information in a profile. Examples of information consumers may change within a profile are: narrowing or expanding of product criteria, general description, channels with which to associate their profiles, number of clicks their profile may receive, number of views their profile or portion of a profile may receive, where and when and to whom the profile is presented, as well as any related privacy setting such as name or contact information available to product or service provider.

The consumer may pay, be paid, receive discounts, points, coupons or any other monitory or non-monitory incentive for creating or interacting with a profile. Or the service may be free to the consumer and they may receive no benefit for creating a profile.

The consumers who are associated with profiles may also be compensated in the form of a discount when they purchase a product or service through a particular retailer. This type of special discount may also leverage the collective buying power of groups. Either user-created or determined-by the respective information site, consumers who are all interested in the same product could all receive select discounts from product or service providers who offer incentives based on the number of people interested in buying at that time.

Product or Service Provider Accounts in the System:

Product or service providers may not be exclusively limited to individuals or entities selling products, and could include any entity, individual, program code, that accesses a profile.

The product or service provider may pay, be paid, participate as a member of a collective, or the service may be free to the product or service provider. Membership may be required or the service may be a free or open source platform that allows product or service providers or users access to all or some of the profiles.

The product or service providers may create an account in the system; however an account may not be required. Product or service providers may access and use their account to select profiles to view based on: search terms that are relevant to the products and services offered by the product or service provider, a particular budget they have established for selecting profiles, or other criteria unrelated to the products they offer but related to purchasers of their products, such as gender.

In would be assumed that the less time that passes between when a consumers requests a product or service, and when the product or service provider accesses the profile of that consumer to offer them products, the greater the chances of doing business with that consumer. For this reason the product or service provider may also be able to setup methods for automatically accessing profiles that meet a particular set of criteria, or could integrate accessing of profiles with any other consumer targeting systems already in use by a product or service provider such as auto responder emails.

Product or service providers may also set up "daily budgets" with filter criteria similar to a CPC campaign budget where filters are set and all profiles are automatically accessed or available to be select that meet their product or service provider's criteria, until the budget is exhausted, for example.

Product or service provider profiles may also store previously accessed consumer profiles for reference, tracking or client management purposes. This could also be used to ensure product or service providers are not charged for accessing the same profile over again unless it was updated.

Product or Service Provider Access of Profiles:

Product or service providers may access profiles through any number of interfaces or platforms such as website, computer applications, or mobile devices, software application, RSS feed, or any program code designed to retrieve profiles or portions of information included within a profile.

Upon access of a profile a product or service provider may be billed or charged. Upon access of the profile: the product or service provider may be provided with, or provided a method to access, the available portion of the accessed profile based on the platform through which it was accessed or other criteria determined by the system, and information inside the profile.

Information provided from the profile to a product or service provider may be provided immediately or could be stored in (or associated with) the Product or service provider's Account for later retrieval or other cross reference proposes.

The product or service provider's selection of a profile may result in an access request being sent to the system for the consumer's profile, and a response by the system transmitting the consumers profile information to the product or service provider.

The product or service provider may only be charged when the consumer is selected by the product or service provider either through a manual selection process, an automated selection process with the product or service providers preset criteria, an automated process based on criteria set by the system, or any combination of methods or means by which the system is able to match a consumer profile with a product or service provider.

Profile Valuation:

One possible method of monetizing this system may be by implementing a Pay per Click (PPC) system. However, rather than costing the advertiser some amount of money every time a person (e.g., the person seeking goods and/or services in this case, otherwise known as the "consumer") clicks on a promotional link, the person offering to provide the goods and/or services (a "professional") may be charged per-profile accessed.

One possible method for determining amount of money charged to product or service providers per-profile accessed may be assigning a value to each profile based on general or specific criteria. Examples that could determine or be combined to determine criteria could be: number previous clicks or times the profile or portion of the profile was accessed, geographic location of the consumer, geographic location of the consumer relative to the product or service provider, date of the consumer's request, last time the profile was updated, specific product or service providers that have previously accessed the profile relative to the current product or service provider, exclusive vs. non-exclusive, the particular product or service provider accessing the profile, criteria set by the system, criteria set by the user. Furthermore, valuation may be influenced by profiles previously contacted by the product or service provider, or the proportional benefit the product or service provider could receive based on the benefit the product or service provider would see from a transaction with this consumer.

This system may also be developed to use a Cost Per Acquisition (CPA), Period Based Subscription, Auction, Fixed Fee, Commodity Market, or any other model (or combination of models) suitable for accountability and revenue generation:

Searching Profiles/Determining Profiles to be Presented

Profiles may be searched and accessed via multiple platforms that interface with the system. Searches may be performed based on any number of criteria or methods. Searches may not be limited to manual input of criteria by a user. Searches may be preformed automatically based on manual input of criteria by a user, program code, previously defined criteria of a user, or the platform in which they are displayed prior to access (such as within a list of results from an internet search engine).

One possible disclosed embodiment may access the system via a website, search available profiles, and display resulting matching profiles based on a search term selected by a product or service provider. Further embodiments may include returning profiles based on:

A search term included as part of an internet search engine query.

Search criteria that only show profiles where the consumer has agreed to allow their information to be provided freely by the product or service provider, or other related privacy or accessibility setting.

Criteria within the profile such as: the geographic location of the user, or geographic relevance to product or service provider.

Criteria within the profile such as: amount of information, quality of information, when the information was providing, and relevance of information provided.

Geographic information associated with the profile such as: geographic areas of interest to the consumer, the geographic areas of interest to the product or service provider, current location of a consumer associated with a profile; with geographic information based on information stored in the profile or from information associated with a profile based on GPS data or other method of determining geographic information such as IP address.

Search results may be listed and arranged in order of relevance, amount consumer is willing to pay, amount and quality of information provided, and time request was made, geographic relevance and search term relevance with the search listing corresponding to the higher of any one or a combination of these variables. For example, page ranking can be performed on a system-wide basis or on a product or service provider-specified basis. One exemplary page ranking technique for a real estate system can utilize the following weighting such that the results are then sorted by final score (highest to lowest).

TABLE I

| Criteria | Sub-criteria | Score Changes | Actions |
|---|---|---|---|
| Name | First name or last name <3 letters | −5 pts | mark invalid |
|  | First or last name is blank | −5 pts | mark invalid |
|  | first or last name includes invalid characters | −3 pts |  |
|  | first or last name appears to be test data | −100 pts | mark invalid |
| Address | street address is blank | −1 pt |  |
|  | address appears to be invalid | −1 pt |  |
|  | state is blank | −1 pt |  |
|  | city is blank | −1 pt |  |
|  | zip code is blank or invalid | −1 pt |  |
|  | city doesn't match state | −1 pt |  |
|  | zip doesn't match state | −1 pt |  |
| Email | email is blank | −1 pt |  |
|  | email does not match email address formats | −1 pt |  |
|  | email address appears to be test data | −100 pts | mark invalid |
| Phone number | phone #1 is blank | −1 pt |  |
|  | phone #2 is blank | −1 pt |  |
|  | phone #1 appears to have invalid format | −5 pts |  |
|  | phone #2 appears to have invalid format | −5 pts |  |

TABLE I-continued

| Criteria | Sub-criteria | Score Changes | Actions |
|---|---|---|---|
|  | phone #1 appears to be test data | −100 pts | mark invalid |
|  | phone #2 appears to be test data | −100 pts | mark invalid |
| Cash on hand | 40k+ | +5 pts |  |
|  | $20k-$40k | +3 pts |  |
|  | $5k-$20k | +2 pts |  |
|  | <$5k | +1 pt |  |
|  | $0 or blank | 0 pts |  |
| Loan Amount | $500k | +7 pts |  |
|  | $300k-$500k | +6 pts |  |
|  | $200k-$300k | +5 pts |  |
|  | $150k-$200k | +4 pts |  |
|  | $100k-$150k | +3 pts |  |
|  | $75k-$100k | +2 pts |  |
|  | $1-$75k | +1 pt |  |
|  | blank or $0 | 0 pts |  |
| Credit history | excellent | +5 pts |  |
|  | good | +4 pts |  |
|  | fair | +2 pts |  |
|  | poor | +1 pt |  |
|  | blank or bad | +0 pts |  |

While the above ranking system utilizes a number of disclosed factors and weights to create a result score, those of skill in the relevant art will understand that other weights and factors can be used instead. For example, whether a property is to be bought as a first home or an investment property can be used. Additionally, points can be assigned (added or subtracted) on other financial factors as well, such as the consumer's income level, the price the consumer has indicated they are willing to pay for such products or services, any discount that the consumer is requesting on the product/service, and/or the value of the particular item or service the consumer has indicated an interest in.

Similarly, geographic information may also cause an increase or decrease in score. For example, if a consumer is looking for a property in a particular area of interest (e.g., an area close to the product or service provider, an area near the area in which the consumer currently resides or an area known to have high sales) a score may be increased, but a score could be decreased if the area of interest for the consumer is outside of where the product or service provider is licensed to provide services. Geographic areas of interest to the consumer and the geographic areas of interest to the product or service provider can both be used (together or individually) and can be specified using a number of techniques such as, but not limited to zip codes, GPS, IP address, points of interest and additional means.

Additionally, "meta" data maintained by the system about a consumer may also be used in page ranking. For example, a first user that has updated his/her profile more recently than a second user (who otherwise has the same characteristics as the first user) may be significantly more valuable to a product or service provider than the second user as the second user may not be an active consumer. Similarly, the number of times that a consumer updates his/her profile can be used as part of page ranking as well. The system can likewise track (and use in page rank) the number of times that a consumer has purchased after being contacted, the number of times that the consumer has bought similar goods, the average price of purchases by the consumer, and/or the number of purchases per time interval by the consumer.

Additionally, "meta" data maintained by the system about the product or service provider may also be used in page ranking. For example, the number of times that the product or service provider selected similar profiles and/or the amount of time that the product or service provider previously spent reviewing similar consumer profiles may be used to affect page ranking.

Yet additional features that can be utilized in page ranking can include, but are not limited to:
1. Number of times the search result or similar search results have been selected (by the product or service provider or other product or service providers).
2. Length of time the search result has been posted.
3. Length of time similar search results remained posted.
4. Relevance to search term, if provided.
5. The length of time the search result or similar result was not selected.
6. Consumer provided direct input.
7. Inferred information collected from other means other than those directly provided by the consumer
8. The particular subject matter.

The above discussion has focused on the use of universal, static ranking where all service providers receive the same search results if they search on the same criteria. However, it is also possible to utilize the above system in the context of an auction or by using bid pricing. For example, if a first service provider indicates that it will pay $1 per lead, then the first service provider may receive a different (and better) set of search results than a second service provider that indicates that it is only willing to pay $0.50 per lead. In such a case, the second service provider may get "delayed leads" where the lead is only placed on the second service provider's results after the lead is older than a particular time period (e.g., half an hour, hour, day or week). Alternatively, the second service provider may get lower scoring leads than the first service provider that has offered to pay more per lead.

The cost per lead also need not be static. As the pool of leads begins to shrink, the cost of each lead may be increased. Similarly, as the pool of leads increases, the cost per lead may decrease in order to have more service providers matched to consumers. The cost per lead may also be affected by "volume discounts" such that a service provider that has purchased a threshold number of leads begins to get a discount on future purchases for a particular period of time. Additionally, price or position may be influenced by specificity of data.

Profile may be included and be listed in combination with "organic search" and "advertising" results on an existing web platform and or search engine.

Additionally, the most preferred iteration of the invention may use the consumers' ideal price point or price range, most recent time of request and geographic area as the most heavily weighted variables in the ranking of results. These variables may be identified and presented as part of the profile prior to the product or service provider selecting and accessing the consumer's profile.

System as Intermediary for Communication

The system of the disclosed embodiments may also act as an intermediary for all or some of the communication of information between the consumers who create profiles and product or service providers who access the profiles. This may include correspondence between the parties or the exchange of funds.

The system of the disclosed embodiments may allow consumers to search for products, and speak with knowledgeable professionals about what they are looking for without divulging personal information that may be sold or passed on to other entities without their direct knowledge.

The system may become the monetary, points, or other exchanger of payment collections or disbursement.

The product or service provider may contact the consumer via a protected email, protected phone, traditional email, text message, telephone, post mail and/or whichever means of communications the consumer (or the system) has indicated or determined to be of benefit to the product or service provider. In addition, the contact with the consumer may be in the form of a "posting" to a password protected message board or web site (e.g. Facebook or LinkedIn). For example, a protected email can be a temporary email address at the intermediary system (e.g., x13kdsf35@systemsdomainname.domainextension) which the system then forwards to a customer's real email address (MeganMatthew@customersdomainname.domainextension), where "domainextension" typically is .com, .edu, etc. Similarly, a protected phone number is a phone number of the system that the product or service provider calls and then the system bridges the call to the customer's real phone number. A system may have multiple phone numbers that it associates with certain leads for a period of time, or the system may have one or more central numbers that once called use PINs and/or system assigned customer numbers that identify which of the leads the product or service provider wishes to contact. Because the system acts as an intermediary, the number of contacts to a potential customer can be limited by the system (e.g., three contacts can be made before the system stops forwarding email or calls). In one embodiment, the system can contact the customer to determine if the customer wishes to authorize an additional number of contacts from the product or service provider such that the product or service provider can continue to send the customer information and/or offers.

In addition to a traditional revenue model where the intermediary facilitating the communication between the two parties collects and retains the revenue, the intermediary site may also perform a revenue split with the consumer using the service. This process may be based on a direct per transaction method (based on typical affiliate programs), or on a dividend method where each member is paid some portion of global payout. This payout may also be in the form of credit or points which could be exchanged for goods, services, or cash. These payouts may also be in the form of "gift cards", for example.

The System

The system for collecting, organizing, storing, and returning lists of profiles to be accessed or delivering information stored with in a profile to a product or service provider when accessed may be stored on a computer on a network, and may be accessed by multiple information sites.

In one possible disclosed embodiment, the system may allow for multiple devices and systems all containing their own methods (collectively platforms) to connect with the system. These platforms would be able to display, submit, create, modify, extract, and monetize profiles within or somehow associated with the system.

Examples of platforms that may access the system include a website related to a particular subject matter, internet search engines, software applications, and mobile devices. The combination of organic search results from an internet search engine combined with a list of consumer profiles may be offered as an option on a search engine or website, if that search engine or website is able to determine if the user is performing a search as a product or service provider or a consumer with an account on the system.

These platforms may access the system via Really Simple Syndication (RSS) feeds, software Application Programming Interfaces (APIs), custom code connected to the system and designed to present information on a website (such as a Widget), or some other code designed to allow other platforms to interface with the system.

The system may determine how each profile is relevant to a search request based on search criteria, program code with thin the system, valuation of the profile, number of search terms, a geographic area, and amount product or service provider is willing to pay for access to all of part of the information contained in the profile, information contained within a profile or group of profiles, other criteria determined by the system, platform accessing the system, or any combination.

The system may, based on user interaction or use of program code, add additional information to a consumer profile based on available information from other data source or providers to further enhance the value of the profile to a product or service provider or further refine a consumers request for a particular product. This may include listing details about previous purchases made or services requested by that consumer, or other product or service providers that this consumer frequents.

Fraud, Privacy, and Spam Protection

The system may employ reasonable measures for fraud protection and abuse. The system may maintain consumer's information, and act as an intermediary for all communications between consumer and product or service provider. Conversely, accounts created by consumers may require some form of verification to ensure that are not charged for false information provided by a consumer, or unauthorized or accidentally access of profiles by their account. Additionally, the implementation of PPC to access/contact the product or service buyers (consumers) would potentially reduce "spam", and increase the value of the intermediary service to both the consumer and the professional. The consumer can block or unblock a particular product or service provider so that the consumer is not bothered by product or service providers they do not want to do business with and this would also keep the product or service provider from selecting the same consumer that does not want to be bothered with unwelcome solicitations.

EXAMPLE #1

An example of this process may be found in the real estate profession where a consumer's profile has been added to a database which indicates that the consumer is searching for a $500,000 home with 4 bedrooms and 3 baths in Scottsdale, Ariz. The consumer request was made at 9:00 am Monday morning.

A loan officer who desires to generate business in that price range performs a search on an internet search engine for consumers who are looking in the $500,000 price range and would be presented with the consumer's profile to be accessed.

A different loan officer who desires to generate business in the city of Scottsdale, Ariz. performs a search on a real estate website for consumers who are searching for homes in the city of Scottsdale. That loan officer is presented with the same consumer's profile.

A third loan officer who desires to generate business in the city of Tempe, Ariz. and desires consumer's in Tempe, Ariz. performs a search in on his mobile devise and is offered the same consumer from Scottsdale profile—because the system determined the target city of the search is relatively close to the one listed in the profile, or because they are both within Maricopa county, or because it was determined that consumers who shop in Scottsdale are likely to desirable consumers for loan officers in Tempe. There are many other cross over data points including time of request, geographically and relevance, only a few of which were discussed here in this example.

EXAMPLE #2

A further example of this process in the real estate profession may be illustrated where a website may exist that may ask members to signup for an account and provide Non-Personal Information, such as details about the type of house they are looking for (e.g., bed bath count, type of house, location, price range), and personal information such as contact information (e.g., name, email address, phone number), etc. The non-personal information, such as the details about the type of house they are looking for, may then be posted in a list with other members on the website. Real estate agents who have also signed up as professional members of the site may then select one of the members from the list and initiate contact through the site. The member may receive a request from the professional member, at which time they would be able to see all the details about the person initiating the request, and can then accept, reject, or report the contact as "spam". If a request is accepted, the member may then discuss further details about the property with the professional member, and if they choose, directly communicate any personal contact information.

EXAMPLE #3

A further example of this process can be illustrated with an example of a consumer searching for a designer handbag. The consumer is interested in a particular handbag from a particular manufacture, and creates a profile with criteria describing the desired bag, and excludes the profile from being seen or accessed by any product or service provider that doesn't offer handbags from that specific manufacturer.

A product or service provider who specializes in handbags from that particular manufacturer may contact the first consumer, and sell them a handbag. After the sale, the consumer may remove their profile as their needs were met. The product or service provider may have the option to keep her information in a database in order to send consumer information to the consumer as new handbags from that same manufacturer become available, in an attempt to secure a future sale.

In the same scenario, if a second consumer who is interested in all designer handbags if they are offered at a reasonable price, may create a profile describing the desire for "all designer handbags a reasonable price", but she may limit the number of contact to 10 per week, for example.

The same product or service provider who contacted the first consumer may also access this profile. Additionally, several other product or service providers' may select the profile, and each may have the option to present their best deal (e.g., no shipping costs, reduced price and so forth). In this case the consumer may leave her profile active as she is willing to buy at least one designer bag per month, so long as she perceives the price to be a bargain, for example. Each of these product or service providers is now working to gain the business of the consumer and the consumer is able to get the best deal on each of her purchases without performing hours of product or service searches.

It is also possible that in this scenario product or service provider may per-purchase or queue up to access this consumer if the allotted number of contacts for the product or service provider has been reached for a particular time frame.

FIG. 1 illustrates an exemplary diagram of a consumer/product or service provider matching environment in accordance with a possible embodiment of the disclosure. The consumer/product or service provider matching environment 100 may include communications network 110, a plurality of consumers 120, a plurality of consumer/product or service providers 130, a consumer/product or service provider matching server 150, and a consumer/product or service provider profile database 160. Communications network 110 may represent any communications network used by consumers and product or service providers to communicate with other entities, including the Internet, an intranet, mobile communication, satellite communications, etc.

The consumers 120 may represent a single person, an entity, a group of persons, or a group of entities, for example. In this manner, a group of persons and/or a group of entities may have greater bargaining power when dealing with a particular or groups of particular product or service providers 130. The product or service provider 130 may be any provider (e.g., store, manufacturer, distributor, company, corporation, entrepreneur, agency, service, etc.) of products and/or services that may be able to provide products or services to one or more consumers 120. The product or service provider 130 may be local to the geographic area of the consumer 120, in a different geographic area to the consumer 120, or be a national or international product or service provider, for example.

The consumer/product or service provider profile database 160 may be coupled to the consumer/product or service provider matching server 150 and may store a plurality of profiles for consumers 120 and product or service providers 130. The database 160 may be accessible and/or searchable by the consumer/product or service provider matching server 150, the consumers 120, and/or the product or service provider 130, for example. The consumer/product or service provider matching server 150 may be any device having a processor and a memory that is able to communicate to and from consumers 120 and product or service providers 130, such as a server, a computer, or a processing device, for example.

Figure 2:
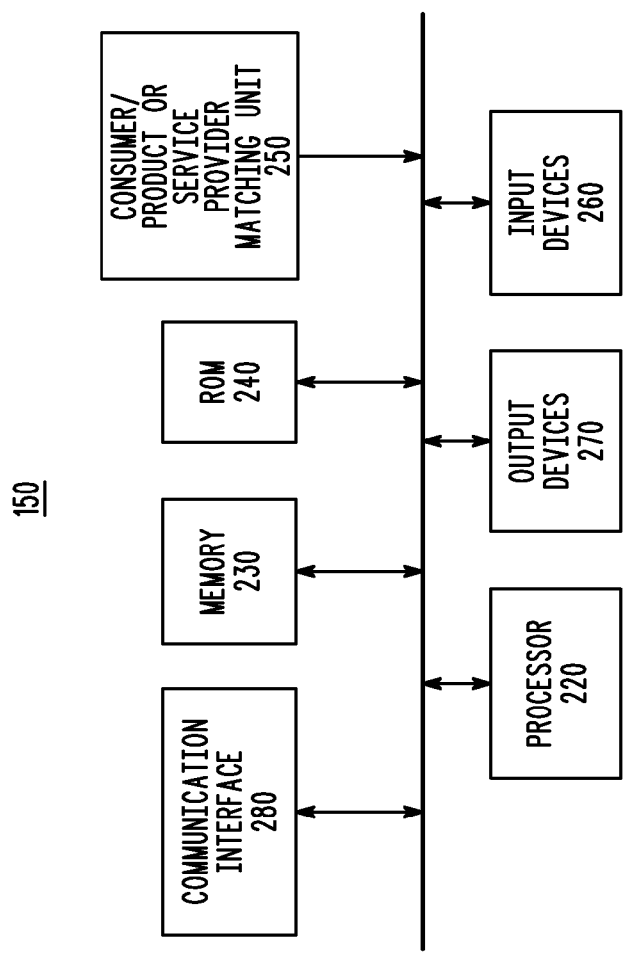
FIG. 2 illustrates a block diagram of an exemplary consumer/product or service provider matching server in accordance with a possible embodiment of the disclosure.

FIG. 2 illustrates a block diagram of an exemplary consumer/product or service provider matching server 150 in accordance with a possible embodiment of the disclosure. As shown, the exemplary consumer/product or service provider matching server 150 may include a bus 210, a processor 220, a memory 230, a read only memory (ROM) 240, a consumer/product or service provider matching unit 250, input devices 260, output devices 270, and a communication interface 280. Bus 210 may permit communication among the components of the consumer/product or service provider matching server 150.

Processor 220 may include at least one conventional processor or microprocessor that interprets and executes instructions. Memory 230 may be a random access memory (RAM) or another type of dynamic storage device that stores information and instructions for execution by flight planning processor 220. Memory 230 may also store temporary variables or other intermediate information used during execution of instructions by the processor 220. ROM 240 may include a conventional ROM device or another type of static storage device that stores static information and instructions for the processor 220.

Input devices 260 may include one or more conventional mechanisms that permit a user to input information to the consumer/product or service provider matching server 150, such as a keyboard, a mouse, a pen, a voice recognition device, etc. Output devices 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables the consumer/product or service provider matching server 150 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the consumer/product or service provider matching server 150, communication interface 280 may not be included in the exemplary consumer/product or service provider matching server 150 when the consumer/product or service provider matching process is implemented completely within the consumer/product or service provider matching environment 100.

The consumer/product or service provider matching server 150 may perform such functions in response to the processor 220 by executing sequences of instructions contained in a computer-readable medium, such as, for example, the memory 230, a magnetic disk, or an optical disk. Such instructions may be read into the memory 230 from another computer-readable medium, such as a separate storage device, or from a separate device via communication interface 280.

The consumer/product or service provider matching server 150 illustrated in FIGS. 1-2 and the related discussion are intended to provide a brief, general description of a suitable computing environment in which the disclosed embodiments may be implemented. Although not required, the disclosed embodiments will be described, at least in part, in the general context of computer-executable instructions, such as program modules, being executed by the consumer/product or service provider matching server 150, such as a general purpose computer. Generally, program modules include routine programs, objects, components, data structures, etc. that perform particular tasks or implement particular abstract data types. Moreover, those skilled in the art will appreciate that other embodiments of the disclosed embodiments may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The operation of the consumer/product or service provider matching unit 250 and consumer/product or service provider matching process will be described below in relation to the diagrams shown in FIGS. 1-2.

Figure 3:
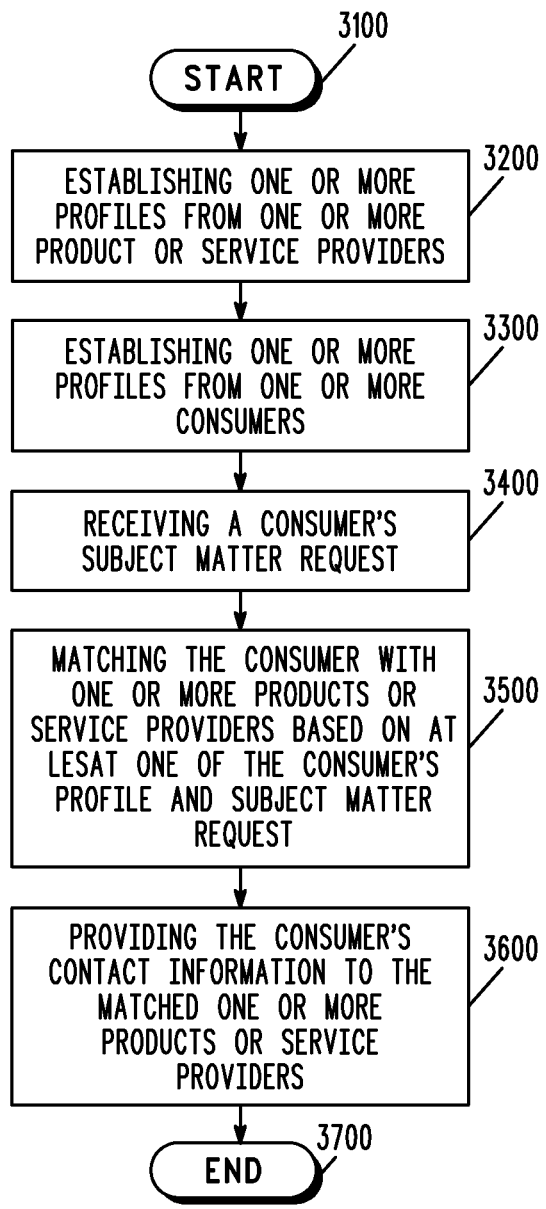
FIG. 3 illustrates an exemplary consumer/product or service provider matching process in accordance with a possible embodiment of the disclosure.

FIG. 3 illustrates an exemplary consumer/product or service provider matching process in accordance with a possible embodiment of the disclosed embodiments. The process may begin at step 3100 and may continue to step 3200 where the consumer/product or service provider matching unit 250 may receive one or more profiles from one or more product or service providers 130. The one or more product or service providers' profiles may include the contact information (including name, address, telephone numbers, email, and website address, the type of product supplied and/or services performed, geographic area covered, payment terms/account information, etc. for example). The consumer 120 and/or the one or more product or service providers 130 may pay to submit profiles and the one or more consumers' profiles and the one or more product or service providers' profiles may be searchable by either the one or more consumers 120 or the one or more product or service providers 130.

At step 3300, the consumer/product or service provider matching unit 250 may receive one or more profiles from one or more consumers 120. The customer's profile may include contact information (including name, address, telephone numbers, and email, and website address, history of type of products or services needed, geographic area lived in or geographic area of interest, payment terms/account information, etc. for example). At step 3400, the consumer/product or service provider matching unit 250 may receive a consumer's subject matter request. The subject matter request may be a request for products or services, an inquiry concerning a geographic area, a subject matter search, etc. The consumer's profile and the consumer's subject matter request may be received by the consumer/product or service provider matching unit 250 through a website, for example.

At step 3500, the consumer/product or service provider matching unit 250 may match the consumer 120 with one or more products or service providers 130 based on at least one of the consumer's profile and subject matter request. At step 3600, the consumer/product or service provider matching unit 250 may provide the consumer's contact information to the matched one or more products or service providers 130. The consumer's contact information may contain a telephone number, an address, an email address, a hyperlink to the consumer's email address, information inferred by the system, or additional consumer profiles, for example. The consumer's profile may contain the contact information that is to be provided to the one or more product or service providers 130, for example.

The one or more product or service provider 130 may be charged each time it is provided access to one of the one or more consumer's profiles. In addition, a particular product or service provider 130 may be charged each time a consumer 120 accesses contact information contained in advertising information of the one particular product or service provider 130. The process may then go to step 3700 and end.

During the above process, the consumers 120 and the one or more product or service providers 130 may be connected to the consumer/product or service provider matching unit 250 through the communication interface 180 through the use of at least one of e-mail, a mobile communications network, telephone, television, electronic communication device, and the internet, for example.

Note that the consumer/product or service provider matching unit 250 may respond to the consumer's subject matter request, and the consumer/product or service provider matching unit 250 may present the consumer 120 with advertising information, for example.

The consumer/product or service provider matching unit 250 may update a consumer's profile based on past purchases of products or services, subject matter requests, etc. for example. The consumer/product or service provider matching unit 250 may send at least one of coupons and discounts to the consumer 120 based on at least one of the consumer's profile, the consumer's current or past product or services purchases, or the consumer's current or past subject matter requests, for example.

The consumer/product or service provider matching unit 250 may derive a geographic area of interest based on the consumer's subject matter request, network address, and/or the consumer's profile, for example. The consumer/product or service provider matches unit 250 may then match the consumer 120 with one or more products or service providers 130 based on the consumer's profile, the subject matter request, and/or the derived geographic area.

FIG. 4 is a screen capture of an exemplary set of results 400 that occur when a real estate-based system performs scoring on a number of consumer profiles (e.g., using the scoring factors and points of Table I above). As illustrated therein, a list of information about potential buyers may be provided to a real estate sales service provider (e.g., a real estate agent) that has performed a search for potential buyers in the 21401 zip code. A first ranked potential consumer 120 may be listed as looking for real estate in Anne Arundel County, will need a mortgage of $100k to $150k, has less than $5k on hand, has a good credit score and has a good income level. The real estate agent can select the corresponding hyperlinks to claim access to the consumer profile or get additional details about the profile. The entry may also indicate that the consumer profile has been claimed by three real estate agents and may specify a corresponding maximum number of times that the profile can be claimed (e.g., four), after which the consumer profile can no longer be claimed. In an alternative embodiment, the number of times that a consumer profile may be claimed may be industry or use-specific, such that the consumer profile can be claimed a maximum number of times in a first industry (e.g., real estate broker), claimed a maximum number of times in a second industry (e.g., mortgage broker), etc. Using the same ranking system, the second ranked potential consumer 120 through an n-th ranked consumer 120 may also be also shown.

While the above discussion has been made with respect to an assumed system-wide page ranking, the system can also be supplemented with a page ranking system that can be specific to a product or service provider. For example, a product or service provider 130 may not care about whether a street address is provided, and may therefore wish to not reduce a score based on those criteria. However, a product or service provider 130 may want to more strongly rank potential buyers in a particular geographic area (e.g., zip code 20001 causes a 10 pt. increase in score or state HI causes a 10 pt. decrease in score).

Furthermore, the system may be configured to override certain scoring factors. For example, a company that specializes in credit repair may wish to provide a higher score to "Poor credit" than "Excellent credit." Thus, a product or service provider 130 may be able to better customize search results as part of their particular product or service provider profile.

Figure 5:
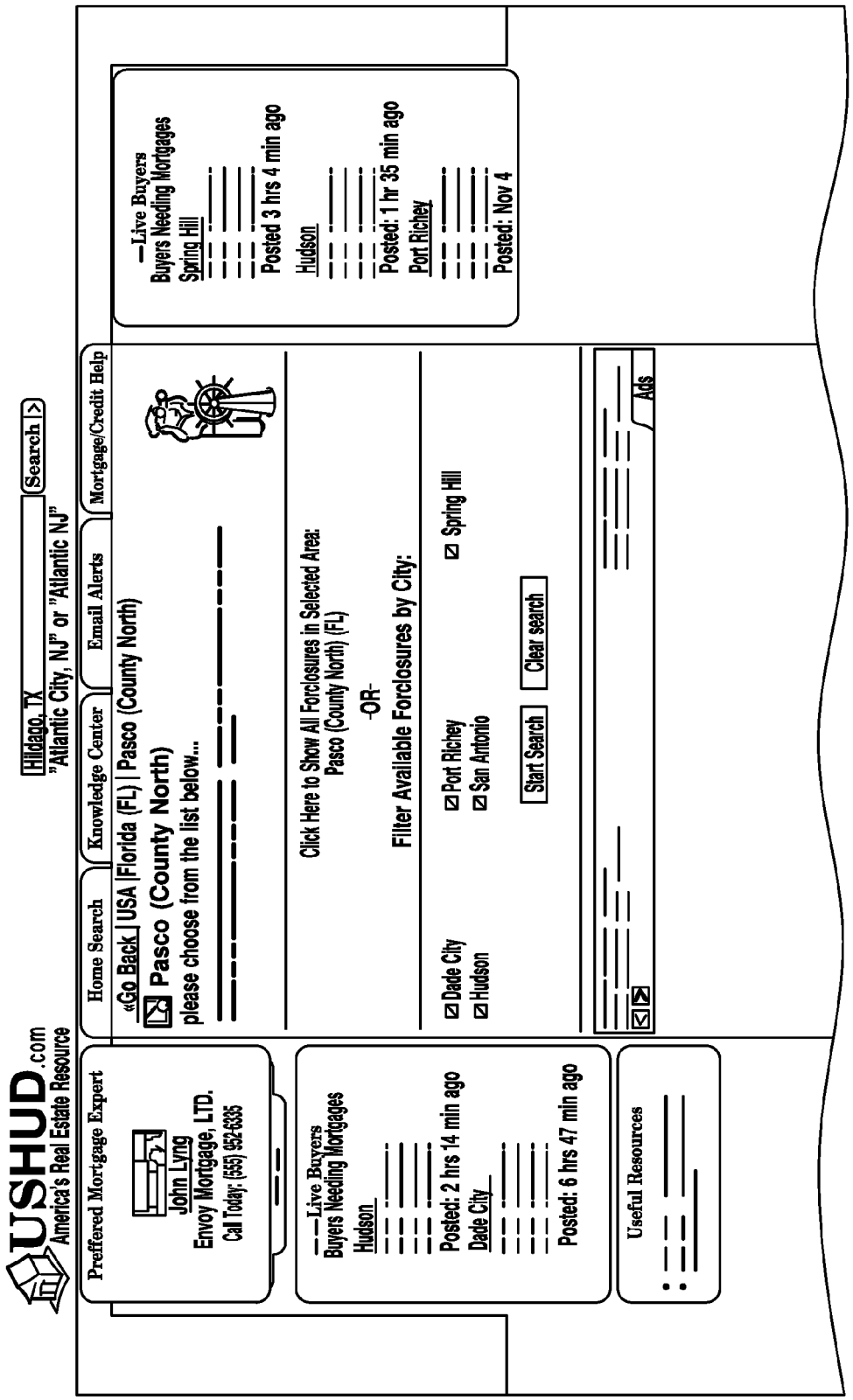
FIG. 5 is a screen capture of an exemplary interface provided by a real estate-based system to enable real estate professionals (e.g., agents and mortgage brokers) to see consumers that are actively looking for real estate or mortgages in a particular region in accordance with a possible embodiment of the disclosure.

FIG. 5 is a screen capture of an exemplary interface 500 provided by a real estate-based system to enable users (e.g., agents, mortgage brokers and/or members of the general public) to see consumers that are actively looking for real estate or mortgages in a particular region. When looking for active leads, it can be beneficial for product and service providers 130 to look for leads in a particular geographic region that the particular product or service provider 130 has experience in or in which one is selling, managing or buying real estate. Alternatively, the geographic area may be selected by using a map instead of using text, drop downs, or an interface that is deemed most appropriate for the user's needs.

An interface such as is shown in FIG. 5 may additionally be supplemented such that the most active product or service providers 130 receive advertising space on the websites on which they are purchasing access to consumer profiles. The advertising space may be in the form of banners or advertisements generally (that are or include hyperlinks to information regarding the product or service provider), or may be specific to geographic regions in which the product or service provider 130 is purchasing access to consumer profiles.

As discussed with respect to "delayed leads" above, some product or service providers 130 may be willing to pay for more timely access to profiles. Profiles can, therefore, be offered on a right of first refusal basis. For example, a first service provider 130 that bids the highest amount may be the first service provider 130 to receive notice of all new or updated consumer profiles that match a specified criteria. The first service provider 130 may then have a set period of time in which to either claim the consumer profile, "pass" on the consumer profile (thereby not exercising the right of first refusal) or "hold" the consumer profile (either at no cost or at a smaller cost than claiming the profile).

After the first product or service provider 130 has passed on a consumer profile (or after a hold has been released or expired), the right to access the consumer profile information would then pass to a second product or service provider 130 (or to a second tier of product or service providers 130). The process could then repeat for as many levels as exist within the system. The hierarchy can be based on bids, historical buying patterns, profiles and/or geographic information, for example. The offering of the consumer profiles can be by email, posting to a website, text message, etc. such that product or service providers 130 are notified of when new consumer profiles are available and by when they must respond Embodiments within the scope of the present disclosed embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosed embodiments are part of the scope of the disclosed embodiments. For example, the principles of the disclosed embodiments may be applied to each individual user where each user may individually deploy such a system. This enables each user to utilize the benefits of the disclosed embodiments even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosed embodiments, rather than any specific examples given.

I claim:

1. A method performed by a consumer/product or service provider matching server for providing product or service providers with an ability to search for consumers having requirements in a particular subject matter area, comprising:

establishing one or more profiles from one or more product or service providers, wherein the established product or service provider profiles are one of received and created;

establishing one or more profiles from one or more consumers, wherein the established consumers profiles are one of received and created;

receiving a request from one of a product provider and a service provider relating to the particular subject matter area;

searching for consumers having requirements in the particular subject matter area in a geographic area of interest, the geographic area of interest being derived based on at least one of the consumer's subject matter request, network address, and the consumer's profile;

providing the one of a product provider and service provider with at least one consumers' information not including contact information based on at least one of the consumer's profile, the subject matter request, and the derived geographic area; and providing the one of a product provider and a service provider with the at least one consumers' contact information based on payment of a fee for access to the consumer's contact information, the fee depending on general and specific criteria estimating the market value of the consumer's contact information and whether or not the one of a product provider and a service provider is permitted exclusive access to the consumer's contact information.

2. The method of claim 1, wherein the consumers and the one or more product or service providers are connected through the consumer/product or service provider matching server that performs the method through the use of at least one of e-mail, a mobile communications network, telephone, television, electronic communication device, and the internet.

3. The method of claim 1, wherein at least one of the consumer and the one or more product or service providers pay to submit profiles.

4. The method of claim 1, wherein at least one of the one or more consumers' profiles and the one or more product or service providers' profiles are stored in a database.

5. The method of claim 1, wherein the consumer represents one of an individual, an entity, one or more individuals and one or more entities.

6. The method of claim 1, wherein at least one of the one or more consumers' profiles and the one or more product or service providers' profiles are searchable by at least one of the one or more consumers and the one or more product or service providers.

7. The method of claim 1, wherein the consumer/product or service provider matching server is one of a server, a computer, and a processing device.

8. The method of claim 1, wherein the one or more product or service provider is charged each time it is provided access to one of the one or more consumer's contact information.

9. The method of claim 1, wherein in response to the consumer's subject matter request, the consumer is presented with advertising information.

10. The method of claim 9, wherein one particular product or service provider of the one or more product or service providers is charged each time a consumer accesses contact information contained in advertising information of the one particular product or service provider.

11. The method of claim 1, further comprising:
storing the one or more consumers' profiles and the one or more product or service providers profiles in a memory.

12. The method of claim 1, wherein the consumer's profile is updated based on at least one of past purchases of products or services and subject matter requests.

13. The method of claim 1, wherein the one or more consumers' profiles and the consumer's subject matter request are received through a website.

14. The method of claim 1, wherein the consumer's contact information contains at least one of a telephone number, an address, an email address, a hyperlink to the consumer's email address, information inferred by the system, and additional consumer profiles.

15. The method of claim 1, wherein the consumer's profile contains the contact information that is to be provided to the one or more product or service providers.

16. The method of claim 1, further comprising:
sending at least one of coupons and discounts to the consumer based on at least one of the consumer's profile, the consumer's current or past product or services purchases, and the consumer's current or past subject matter requests.

17. The method of claim 1, further comprising:
deriving a geographic area of interest based on at least one of the consumer's subject matter request, network address, and the consumer's profile, wherein the consumer is matched with one or more products or service providers based on at least one of the consumer's profile, the subject matter request, and the derived geographic area.

* * * * *